(12) United States Patent
Li et al.

(10) Patent No.: US 10,592,754 B2
(45) Date of Patent: Mar. 17, 2020

(54) SHADOW REMOVING METHOD FOR COLOR IMAGE AND APPLICATION

(71) Applicant: Peking University Shenzhen Graduate School, Shenzhen, Guangdong Province (CN)

(72) Inventors: Ge Li, Shenzhen (CN); Zhenqiang Ying, Shenzhen (CN)

(73) Assignee: PEKING UNIVERSITY SHENZHEN GRADUATE SCHOOL (CN)

( * ) Notice: Subject to any disclaimer, the term of this patent is extended or adjusted under 35 U.S.C. 154(b) by 0 days.

(21) Appl. No.: 16/089,462

(22) PCT Filed: Dec. 13, 2016

(86) PCT No.: PCT/CN2016/109612
§ 371 (c)(1),
(2) Date: Sep. 28, 2018

(87) PCT Pub. No.: WO2018/023916
PCT Pub. Date: Feb. 8, 2018

(65) Prior Publication Data
US 2019/0340446 A1    Nov. 7, 2019

(30) Foreign Application Priority Data
Aug. 1, 2016   (CN) .......................... 2016 1 0621447

(51) Int. Cl.
*G06K 9/00* (2006.01)
*G06T 7/11* (2017.01)
(Continued)

(52) U.S. Cl.
CPC .......... *G06K 9/00798* (2013.01); *G06K 9/44* (2013.01); *G06T 5/002* (2013.01); *G06T 7/11* (2017.01);
(Continued)

(58) Field of Classification Search
None
See application file for complete search history.

(56) References Cited

U.S. PATENT DOCUMENTS

| 2003/0223615 A1* | 12/2003 | Keaton | G06K 9/0063 382/100 |
| 2013/0039574 A1* | 2/2013 | McKay | G06K 9/0063 382/167 |

(Continued)

FOREIGN PATENT DOCUMENTS

| CN | 104240207 | 12/2014 |
| CN | 105488492 | 4/2016 |

(Continued)

OTHER PUBLICATIONS

Ying, Zhenqiang et al., "A Novel Shadow-Free Feature Extractor for Real-Time 1-10 Road Detection", Proceedings of the 2016 ACM on Multimedia Conference,/(/), Oct. 19, 2016 (Oct. 19, 2016), ISSN:/, 3. Our Approach. CN.

(Continued)

*Primary Examiner* — David Perlman
(74) *Attorney, Agent, or Firm* — The Belles Group, P.C.

(57) ABSTRACT

Disclosed are a shadow removing method for an image and an application. The shadow removing method comprises a shadow-free feature analysis process, a shadow-free transformation parameter acquisition process and a shadow-free feature imaging process. The application is for road surface detection, a detection method comprising: firstly, using a shadow-free feature extraction method to select a region of interest and extract a feature; next, performing image filtering, segmentation and road surface region selection; lastly, performing image morphology filtering and hole filling. The method may remove shadows in color images, thus serving as a pre-processing step applied in various machine vision fields, and the application in road surface detection may solve the problem of detecting a road surface in dark shadows. The method has the advantages of having low complexity, high processing speed and high accuracy.

9 Claims, 2 Drawing Sheets

(51) Int. Cl.
*G06T 7/90* (2017.01)
*G06K 9/44* (2006.01)
*G06T 5/00* (2006.01)

(52) U.S. Cl.
CPC ...... *G06T 7/90* (2017.01); *G06T 2207/10024* (2013.01); *G06T 2207/30256* (2013.01)

(56) References Cited

U.S. PATENT DOCUMENTS

2016/0180201 A1    6/2016  Aubert et al.
2017/0177933 A1*   6/2017  Mittal ................ G01C 21/3676

FOREIGN PATENT DOCUMENTS

CN    105678285 B    6/2016
JP    2014130404     7/2014

OTHER PUBLICATIONS

Finlayson, G.D. et al., "On the Removal of Shadows from Images", IEEE Transactions 1-2,4-7 on Pattern Analysis and Machine Intelligence, 28(1), Jan. 31, 2006 (Jan. 31, 2006), ISSN: 0162-8828, II. One-Dimensional Shadow Free Images, figure 2, and abstract. US. International Search Report and Written Opinion for corresponding Application No. PCT/CN2016/109612 dated Mar. 15, 2017. WO. International Search Report, PCT/CN2016/109612, dated Mar. 15, 2017, pp. 1-3.

* cited by examiner

SHADOW REMOVING METHOD FOR COLOR IMAGE AND APPLICATION

CROSS-REFERENCE TO RELATED PATENT APPLICATIONS

The present application is a U.S. national stage application under 35 U.S.C. § 371 of PCT Application No. PCT/CN2016/109612, filed Dec. 13, 2016, which claims priority to Chinese Patent Application No. 201610621447X, filed Aug. 1, 2016. The disclosures of the aforementioned priority applications are incorporated herein by reference in their entireties.

TECHNICAL FIELD

The invention relates to the field of machine vision, in particular to a shadow removing method for a color image and an application in road surface region detection based on the method.

BACKGROUND ART

Shadows in images have influence on machine vision algorithms for edge extraction and image matching. A color image is composed of three grayscale component images of RGB. Since the grayscale images of the three components are quite similar, the machine vision algorithms usually convert them into one grayscale component for processing. Since all of the three grayscale components contain brightness information, the interference problem of illumination changes exists by directly using the three components or using a grayscale component composed of the weighted sum and the maximum and minimum values thereof. Especially in the presence of shadows, the illumination changes have a great influence on the machine vision algorithms. The pre-processing of shadows by the existing methods is mainly divided into three types: anti-shadow feature extractor, shadow-free feature extractor, and shadow detection and removal method.

1. Anti-shadow feature extractor Brightness components and color components insensitive to illumination changes are extracted through color space conversion, and color components are used for subsequent processing. Since the description of color space is based on an ideal model, although the extractors can reduce shadow interference to some extent, shadows in an image cannot be completely removed. Especially in the case of strong shadows, the extractors may fail completely.

2. Shadow-free feature extractor A shadow-free feature extractor obtained through theoretical analysis and experiments of imaging physics can completely remove shadows. However, the existing methods are still unable to deal with certain strong shadow situations.

3. Shadow detection and removal method Firstly, a shadow region is detected, and then the part with the shadow is repaired by using a restoration algorithm. This method is often complicated and slow in processing, and most of the existing methods may cause missing of the detailed information of the shadow region to varying degrees.

On the whole, the existing shadow processing methods cannot realize a good shadow removal effect while ensuring real-time performance (fast processing speed), especially in the case of strong shadows. This makes shadow interference a problem for many machine vision tasks requiring high real-time performance, such as road detection in the intelligent vehicle perception technology.

The intelligent vehicle perception technology enables vehicles to actively perceive the surrounding environment, thus actively preventing traffic accidents and even realizing automatic driving. Road identification is a prerequisite for driving, so road detection is an indispensable part of intelligent vehicle perception. A road detection method processes a road image from the view of a driver and detects the region where the road surface is located. Trees and buildings on the roadside may leave shadows on the road, especially when the light is strong, the interference of shadows is very serious, which makes it difficult to correctly detect the road region.

SUMMARY OF THE INVENTION

In order to overcome the shortcomings of the prior art, the invention provides a shadow removing method for a color image and an application in road surface region detection based on the method. The method of the invention can remove shadows existing in a color image and is applied to various machine vision fields as a pre-processing step. The application in road surface region detection based on the method is specifically about using the shadow removing method to solve the problem of road surface detection in the presence of strong shadows.

The shadow removing method provided by the invention comprises shadow-free feature analysis, shadow-free transformation parameter acquisition and shadow-free feature imaging. The road surface detection method comprises the steps of: firstly, using the above-mentioned shadow-free feature extraction method to select a region of interest and extract a feature; next, performing image filtering, segmentation and road surface region selection; lastly, performing image morphology filtering and hole filling. The shadow removing method for a color image provided by the invention comprises a shadow-free feature analysis process, a shadow-free transformation parameter acquisition process and a shadow-free feature imaging process. The shadow removing method can be applied to road detection. Besides, the shadow removing method can also be applied to other scenes, including foreground segmentation, image matching, color-based image segmentation and edge extraction. In the case of foreground segmentation, because the projection of a foreground object of interest may also move along with the object and there may be moving shadows in the background, some shadows may be mistakenly recognized as the foreground. After using the method to remove shadows and then adopting a foreground segmentation algorithm, interference caused by shadows can be reduced. In the case of image matching, illumination difference is another big problem in image matching. We hope that objects under different illumination conditions can be matched correctly, but do not want a matching algorithm to fail due to illumination nonuniformity caused by local shadows. Therefore, the method is also applicable to image matching, and can be further applied to image-based positioning systems. The technical scheme provided by the invention is as follows:

the shadow removing method for an image comprises the shadow-free feature analysis and extraction process, the shadow-free transformation parameter acquisition process and the shadow-free feature imaging process.

Specifically, the method comprises the following steps:

(1) the shadow-free feature analysis and extraction process: carrying out statistical analysis on the pixel RGB values of the same material in the original image under different illumination conditions, or finding out invariable characteristics in a shadowy image through a physical imaging model to obtain the expression K=f(R, G, B, . . . ) of shadow-free features, wherein K is a shadow-free feature matrix, R, G and B correspond to three component matrices of the red color, green color and blue color of the original image respectively, . . . represents other additional parameters, and f is a conversion expression;

(2) the shadow-free transformation parameter acquisition process: for the shadow-free feature matrix K=f(R, G, B, . . . ) in step (1), obtaining the corresponding shadow-free feature matrix K through calculation by determining the parameters in the expression;

(3) the shadow-free feature imaging process: converting the shadow-free matrix into a grayscale image, and obtaining a shadow-free feature grayscale image through feature visualization.

For the above shadow removing method for an image, further, in step (1), the expression of the shadow-free features is defined by using a linear relation of RGB space, wherein the linear relation of the RGB space includes a linear relation of every two components of RGB or a linear relation of a linear combination of three components of RGB.

For the above shadow removing method for an image, further, in step (1), the linear relation between B and G components is selected to represent the shadow-free features of the image for road surface detection, and the expression of the shadow-free features is formula 1:

$$f; (G, B, b) \to K, K = \frac{G-b}{B},\quad \text{(formula 1)}$$

wherein b is other parameters to be determined, and the geometric meaning is the intercept of a fitting straight line; for a road surface region, K is a fixed value, and K is the required shadow-free feature matrix. For the above shadow removing method for an image, further, in step (3), the shadow-free feature matrix is converted into the grayscale image, and specifically, the grayscale value of the material of the region of interest is extracted through an image segmentation method. Further, the image segmentation method specifically normalizes the shadow-free feature matrix so that the values of each element of the matrix are distributed between 0 and 1, thus obtaining the shadow-free feature grayscale image. More specifically, the lower and upper bounds m and n of an optimal interval of a natural image feature value are obtained by solving an optimal partition interval, and then the interval (m, n) is mapped to the interval (0, 1) for normalization to obtain the shadow-free grayscale image C, wherein the optimal partition interval is solved by formulas 1 to 3, the values of K corresponding to pixel values in one or more images are calculated, the maximum and minimum values of K are recorded as $K_{max}$ and $K_{min}$, and a statistical histogram is recorded as H:

$$\max: g(m, n) - c(m, n) \quad \text{(formula 1)}$$

$$g(m, n) = \frac{\sum_{i=m}^{n} H(i)}{\sum_{i=K_{min}}^{K_{max}} H(i)} \quad \text{(formula 2)}$$

$$c(m, n) = \frac{m-n}{K_{max} - K_{min}}, \quad \text{(formula 3)}$$

wherein m and n are the lower and upper bounds of the required optimal interval, and the interval (m, n) is mapped to the interval (0, 1) for normalization:

$$C = \frac{K-m}{n-m}, \quad \text{(formula 4)}$$

so as to obtain the final shadow-free grayscale image C.

The shadow removing method for an image provided by the invention can be applied to various machine vision fields, including image foreground segmentation, image matching, color-based image segmentation and edge extraction, road detection and other scenes.

The invention specifically provides an application of the shadow removing method for an image in road detection, which comprises an image pre-processing process, a road surface extraction process and an image post-processing process. Specifically, firstly, selection of a region of interest and extraction of a feature are performed through shadow-free feature extraction; next, image filtering, segmentation and road surface region selection are performed; lastly, image morphology filtering and hole filling are performed. Specifically, the application comprises the following steps:

(81) the image pre-processing process: removing irrelevant regions and interference information;

(82) the road surface extraction process: comprising image segmentation and road surface region selection, wherein a road image is divided into a plurality of regions through image segmentation, each region is evaluated through road surface region selection, and the region which is most likely to be a road surface is selected; and

(83) the image post-processing process: removing excess parts through image morphology filtering, filling holes in the road surface region by adopting a hole filling algorithm, and outputting the road detection result after finishing the post-processing.

For the above application of the shadow removing method for an image in road detection, in step (81), the irrelevant regions are removed specifically by selecting the region of interest, and the interference of shadows is removed through shadow-free feature extraction, so as to obtain the shadow-free grayscale image.

Further, the shadow-free grayscale image is represented by formula 5:

$$C = 2 - \frac{G-b}{B}, \quad \text{(formula 5)}$$

wherein C is the shadow-free grayscale image, G and B correspond to the component matrices of the green color and blue color of the image respectively, b is the camera parameter, and the intercept of the straight line on the G axis is obtained for fitting.

Compared with the prior art, the invention has the following beneficial effects:

Compared with the three existing technologies summarized in the background art (anti-shadow feature extractor, shadow-free feature extractor, and shadow detection and removal method), the method combines the advantages of low complexity (determining the processing speed) and high accuracy. For some cases of strong shadows, neither the anti-shadow feature extractor nor the shadow-free feature extractor can work well. Moreover, feature images extracted by the anti-shadow feature extractor and the shadow-free feature extractor have poor discrimination, which is not conducive to the subsequent image processing and analysis work.

In contrast, the shadow removing method provided by the invention has good discrimination and facilitates subsequent processing such as image segmentation. The third technology, shadow detection and removal, has the defects of high complexity and slow processing speed, while the method provided by the invention realizes an accurate shadow removal effect under the condition of low complexity and can cope with occasions requiring high real-time performance. Therefore, the method of the invention can remove shadows existing in a color image and is applied to various machine vision fields as a pre-processing step. By adopting the shadow removing method provided by the invention firstly for pre-processing, and then using a corresponding processing method, the robustness of the shadow removing method to shadow interference can be improved, and better performance can be achieved.

DETAILED DESCRIPTION OF THE INVENTION

Figure 1:
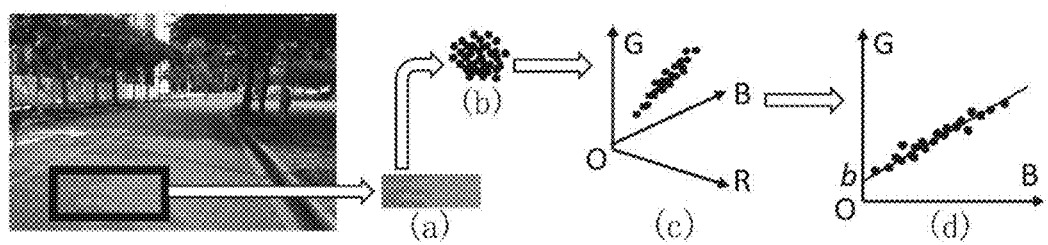
FIG. 1 is a schematic diagram of the distribution law of pixel values in RGB space using the same material plane in an example of the present invention, wherein (a) is a road surface region (sample of an object of interest) selected from a road image; (b) is pixel points in the region; (c) is drawing the pixel points into the RGB three-dimensional space, wherein the points are distributed near a straight line; and (d) is projecting the pixel points in the three-dimensional space onto a GB two-dimensional plane, wherein the coordinates of the points can be fitted with one straight line.
Figure 2:
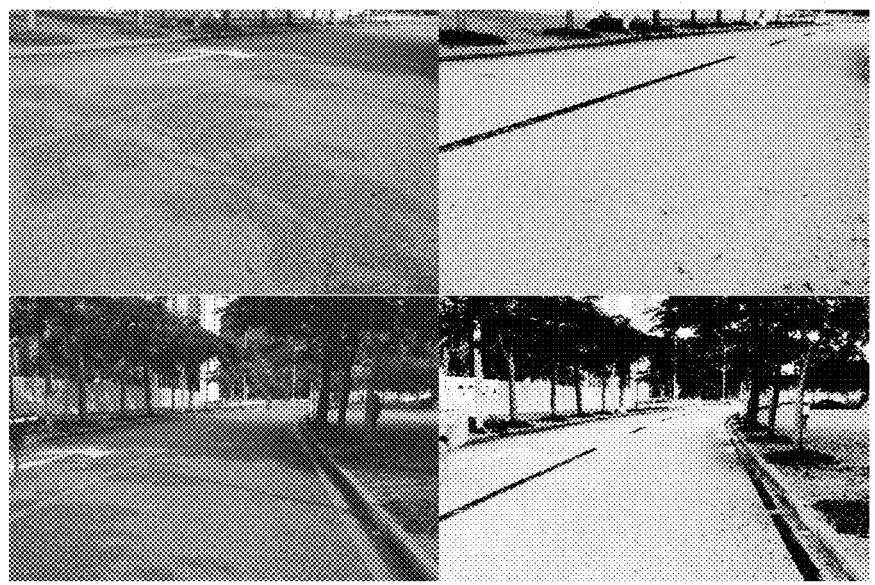
FIG. 2 is a shadow removing effect diagram of an example of the present invention, wherein the left figure is a grayscale image of an original image, and the right figure is an obtained corresponding shadow-free image.

The present invention will be further described by way of example with reference to the accompanying drawings, but the scope of the invention will not be limited in any way.

The invention provides a shadow removing method for a color image and an application in road surface region detection based on the method, and provides an implementation example for solving the problem of road surface detection in the presence of strong shadows by using the shadow removing method. The method of the invention can remove shadows existing in a color image and is applied to various machine vision fields as a pre-processing step.

The specific implementation of the shadow removing method for an image and a road surface detection method provided by the present invention will be described below. The shadow removing method comprises shadow-free feature analysis, shadow-free transformation parameter acquisition and shadow-free feature imaging. The road surface detection method comprises the steps of: firstly, using the above-mentioned shadow-free feature extraction method to select a region of interest and extract a feature; next, performing image filtering, segmentation and road surface region selection; lastly, performing image morphology filtering and hole filling.

In the shadow removing method for an image, the design framework of a shadow-free feature extractor comprises three major steps: shadow-free feature analysis, shadow-free transformation parameter acquisition and shadow-free feature imaging.

Shadow-free feature analysis: carrying out statistical analysis on the pixel RGB values of the same material in a shadowy image under different illumination conditions, or finding out an invariable characteristic law therein through a physical imaging model, wherein the law is described by the expression K=f(R, G, B, . . . ) of shadow-free features, K is a shadow-free feature matrix, R, G and B correspond to three component matrices of the red color, green color and blue color of an original image respectively, . . . represents other possible parameters, and f is a conversion expression. Specifically, we adopt the linear law of RGB space: pixels located on the same material plane are mapped to the RGB space, and the pixel values thereof are distributed on a straight line, as shown in Fig. (c). For different problems, we can adopt different definition ways. Taking the problem of road surface detection as an example, we can select only B and G components and give the following definition of shadow-free features:

$$f: (G, B, b) \to K, K = \frac{G - b}{B},$$

wherein b is an additional parameter to be determined. The derivation of this definition is based on the linear relation between B and G components. After projecting the three-dimensional pixel distribution of the right figure onto a BG coordinate plane, it can be seen that there is a linear relation between B and G, as shown in FIG. 1(d), so for the road surface region, K is a fixed value, and K is the required shadow-free feature matrix. In addition, many other variations can be defined by using the linear law of the RGB space, such as using the linear relation between the other two components or the linear relation between the linear combinations of the three components.

Shadow-free transformation parameter acquisition: In the expression, in addition to the pixel values (R, G, B) of each point to be determined, there are generally other parameters needing to be determined, and the parameters are determined by data fitting or other calibration methods; and in the previous definition, b is the parameter to be determined, and the geometric meaning thereof is to fit the intercept of the straight line. For road surface detection, the plane we are interested in is a road surface, by fitting the pixels in the road surface region, the value of the intercept of the obtained straight line on the G axis is obtained, which is the value of b to be determined; after determining the value of b, a color image of the road (RGB is known) is input, so as to calculate the corresponding shadow-free matrix.

Shadow-free feature imaging: In this step, the obtained features are visualized (the matrix is converted into a grayscale image suitable for observation by human eyes), and then a shadow-free feature grayscale image is obtained. In order to visualize the feature matrix, the simplest imaging method is to normalize the feature matrix directly, that is to make the values of each element of the matrix distributed between 0 and 1. If there is a pixel with a very large or very small value, the contrast of the whole image will be very low. Therefore, in order to obtain an effective feature grayscale image, we need to analyze the distribution of the feature value for natural images in application and eliminate those rather small or large pixel values. Taking road surface detection as an example, the pixel values in one or more road images can be taken out, the values of K corresponding to the pixel values can be calculated respectively, the maximum and minimum values of K are recorded as $K_{max}$ and $K_{min}$ respectively, a statistical histogram is recorded as H, and then the solution of an optimal partition interval can be defined as an optimization problem:

$$\max: g(m, n) - c(m, n)$$

$$g(m, n) = \frac{\sum_{i=m}^{n} H(i)}{\sum_{i=K_{min}}^{K_{max}} H(i)}$$

$$c(m, n) = \frac{m - n}{K_{max} - K_{min}},$$

wherein m and n are the lower and upper bounds of the required optimal interval. After the optimal solution is obtained, the (m, n) interval is mapped to the (0, 1) interval for normalization, and the final shadow-free grayscale image C is obtained:

$$C = \frac{K - m}{n - m}.$$

The invention also provides a road detection framework based on shadow-free feature extraction. FIG. 1 is a flowchart of an application of the shadow removing method for an image provided by the invention in road surface detection, and the application mainly comprises three parts:

Image pre-processing: The purpose of pre-processing is to remove irrelevant regions and interference information. Here, irrelevant regions are removed by selecting the region of interest, and shadow interference is removed through shadow-free feature extraction.

Road surface extraction: After pre-processing, the existing road surface extraction methods can resist shadow interference and no longer fail in the presence of strong shadows. Road surface extraction is mainly divided into two steps: image segmentation and road surface region selection. The road image is divided into a plurality of regions by image segmentation; and then road surface region selection is conducted: each region is evaluated, and the region which is most likely to be a road surface is selected.

Image post-processing: The road surface candidate regions obtained through road surface extraction are not perfect and may contain redundant or missing regions. Excess parts can be removed through image morphology filtering. Lane markings on roads may form holes in the region, and a hole filling algorithm is used to fill the holes. The final road detection result is output after finishing the post-processing.

Example 1

In the example of the invention, based on the design framework of a shadow-free feature extractor, a shadow-free feature extractor suitable for road surface detection is provided, which comprises the following steps:

Offline camera calibration: An image of an application scene is calibrated, i.e. an object region of interest is manually marked. Calibration can be accomplished using interactive software. For road surface detection, the region we are interested in is a road surface. After opening a shadowy image and marking part of the road surface region, as shown in FIG. 1 (a), the interactive software will draw image pixels inside the region, as shown in FIG. 1 (b), to RGB space as shown in FIG. 1 (c), and then conduct projection to GB space. The distribution of pixel point clouds can be fitted by a straight line equation, the intercept b of the straight line on the G axis obtained through data fitting by the software is the required camera parameter, as shown in FIG. 1 (d).

Mapping scope determination: After obtaining the camera parameter b, the next step is to determine a normalized interval, i.e. the above-mentioned m and n. Taking the road image selected earlier as an example, in order to simplify the calculation, we choose m=1 and n=2 as the normalized interval. In addition, in order to make an obtained shadow-free grayscale image more natural, reversal processing is conducted (using 1-C instead of C). The final shadow-free grayscale image is defined as:

$$C = 2 - \frac{G - b}{B}.$$

The above conversion formula can be used to convert the color road image into the shadow-free grayscale image, and the experimental results show that the formula can not only be applied to road images, but also has a good shadow removal effect for most natural images. The shadow-free feature extraction effect obtained by the method is shown in the drawings.

Example 2

Figure 3:
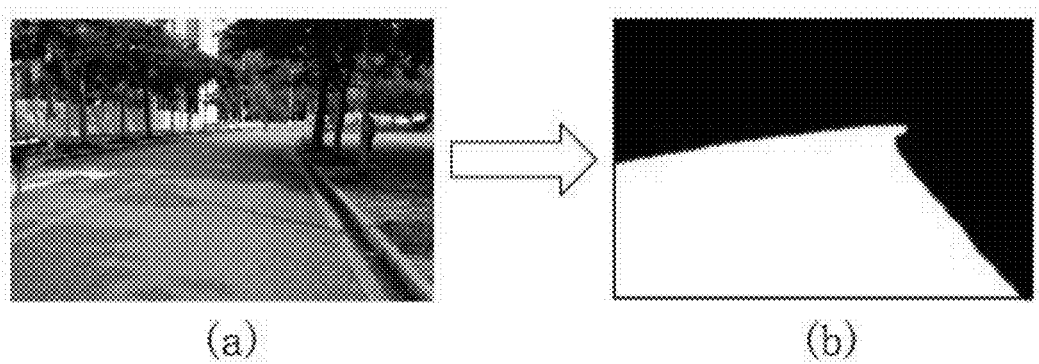
FIG. 3 is an illustration of a road detection task, wherein the left figure (a) is the original image as an input, and the right picture (b) is an output processing result, representing the position of the road surface region with a binary image.
Figure 4:
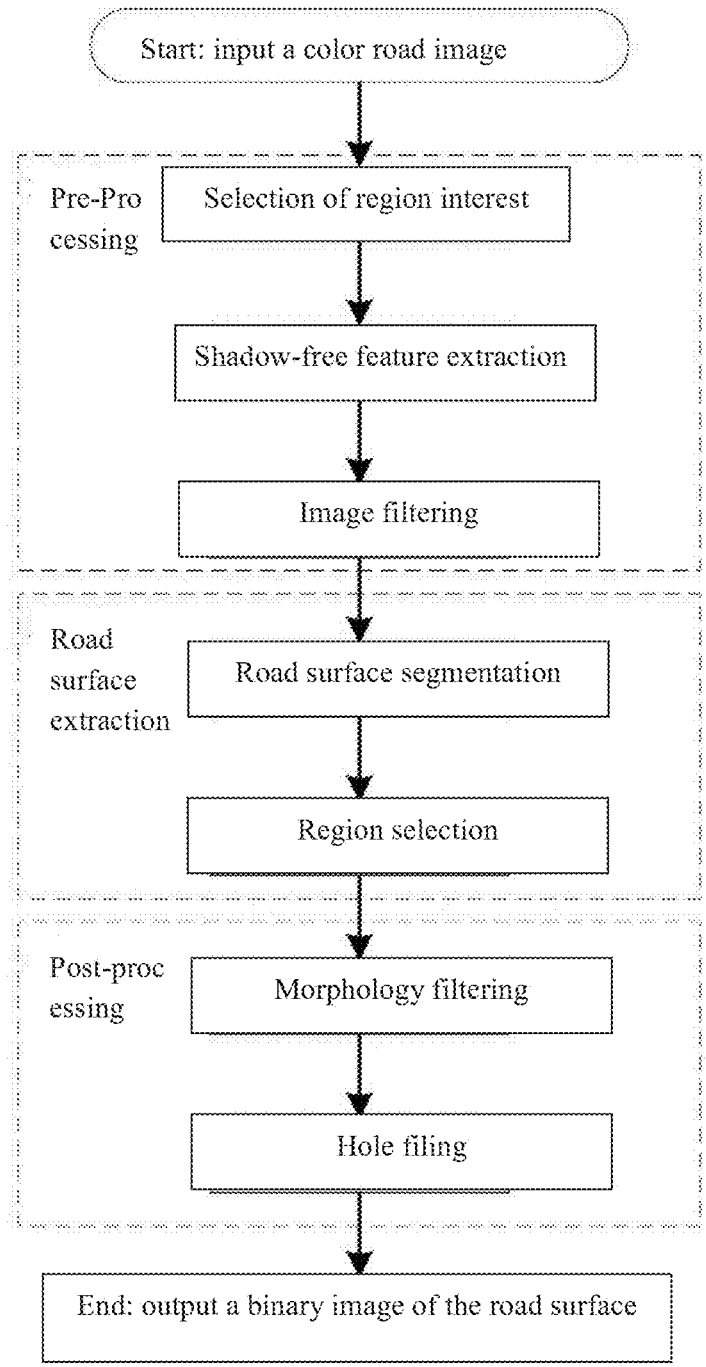
FIG. 4 is a flowchart of an application of a shadow removing method for an image provided by the invention in road surface detection.

In the example of the invention, a road surface detection method is provided. The road detection method processes a road image from the view of a driver and detects the region where the road surface is located, as shown in FIG. 3. The frame of the road surface detection method is shown in FIG. 4 and specifically comprises the following steps:

Selection of region of interest (ROI): The step limits the subsequent processing steps to one sub-region to improve the system efficiency. Processing irrelevant regions not only wastes time, but also may introduce noise to affect the performance of a system. Therefore, the first step is to define which image regions are useless and which regions are useful for implementation and application. Regions useful for subsequent processing are called regions of interest. In addition, from a simple point of view, rectangular regions of interest are generally selected and divided according to a rectangular ROI window to directly obtain a sub-image, which facilitates subsequent processing. For road detection, we are interested in the road surface part. However, in a road image of acquisition equipment (such as an automobile data recorder and a vehicle camera), the road surface is generally located in the lower half, and the upper half is mainly the sky which is interference information for road detection. The lower half of the image can be directly selected as the region of interest for simplicity, or certain adjustment can be made according to the actual application to adopt a more accurate ROI.

Road surface feature extraction: Generally, color information is used for road surface segmentation, but due to the fact that a large number of shadows may occur on the road surface, segmentation using color information may fail. We use the shadow-free feature extraction method proposed earlier to input a color image in ROI and output a shadow-free grayscale image.

Image filtering and denoising: There may be noise in the original image, and noise may also be introduced in the previous road surface feature extraction step. The step removes the noise by applying a set of filters to the image. Firstly, median filtering is conducted to remove salt-and-pepper noise; secondly, smooth filtering is conducted to filter out high-frequency noise.

Image segmentation: An image segmentation algorithm is used to segment the filtered image into a plurality of connected regions.

Road surface region selection: Since the road surface is the most significant region in ROI and covers the largest region, the largest road surface region can be extracted through connected component analysis. The use of connected components is the simplest method to select the road surface region from the divided regions. It is also possible to select the region closest to the road surface feature by classifying region features, thus extracting the road surface region more accurately.

Image morphology filtering: The road surface region obtained by connected component analysis may contain some irrelevant regions, which can be removed by morphological filtering of a binary image.

Hole filling: Road markings on the road surface may form some holes in the extracted region, and the holes can be filled by using a hole filling algorithm, so as to obtain the final road surface detection result.

It should be noted that the purpose of the disclosed examples is to help further understand the invention, but those skilled in the art will understand that various substitutions and modifications are possible without departing from the spirit and scope of the invention and the appended claims. Therefore, the invention should not be limited to what is disclosed in the examples, and the scope of protection of the invention is subject to the scope defined in the claims.

The invention claimed is:

1. A shadow removing method for an image, comprising a shadow-free feature analysis and extraction process, a shadow-free transformation parameter acquisition process and a shadow-free feature imaging process; the method specifically comprising the following steps:

(1) the shadow-free feature analysis and extraction process: carrying out statistical analysis on pixel RGB values of the same material in the original image under different illumination conditions, or finding out invariable characteristics in a shadowy image through a physical imaging model to obtain the expression K=f (R, G, B, . . . ) of shadow-free features, wherein K is a shadow-free feature matrix, R, G and B correspond to three component matrices of the red color, green color and blue color of the original image respectively, . . . represents other parameters, and f is a conversion expression, wherein the linear relation between the B and G components is selected to represent the shadow-free features of the image for road surface detection, and the expression of the shadow-free features is:

$$f:(G, B, b) \rightarrow K, K = \frac{G-b}{B},$$

wherein b is other parameter to be determined, and the geometric meaning is the intercept of a fitting straight line, and for a road surface region, K is a fixed value, and K is the required shadow-free feature matrix;

(2) the shadow-free transformation parameter acquisition process: for the shadow-free feature matrix K=f(R, G, B, . . . ) in step (1), obtaining the corresponding shadow-free feature matrix K through calculation by determining the parameters in the expression; and (3) the shadow-free feature imaging process: converting the shadow-free matrix into a grayscale image, and obtaining a shadow-free feature grayscale image through feature visualization.

2. The shadow removing method for an image according to claim 1, characterized in that in step (1), the expression of the shadow-free features is defined by using a linear relation of RGB space, wherein the linear relation of the RGB space includes a linear relation of every two components of RGB or a linear relation of a linear combination of three components of RGB.

3. The shadow removing method for an image according to claim 1, characterized in that in step (3), the shadow-free feature matrix is converted into a grayscale image, and specifically, the grayscale value of the material of the region of interest is similar compared with other regions and therefore can be extracted through an image segmentation method.

4. The shadow removing method for an image according to claim 3, characterized in that the image segmentation method specifically normalizes the shadow-free feature matrix so that the values of each element of the matrix are distributed between 0 and 1, thus obtaining the shadow-free feature grayscale image.

5. The shadow removing method for an image according to claim 4, characterized in that lower and upper bounds m and n of an optimal interval of a natural image feature value are obtained by solving an optimal partition interval, and then the interval (m, n) is mapped to the interval (0, 1) for normalization to obtain the shadow-free grayscale image C, wherein the optimal partition interval is solved by formulas 1 to 3:

the values of K corresponding to pixel values in one or more images are calculated respectively, the maximum and minimum values of K are recorded as $K_{max}$ and $K_{min}$ respectively, and a statistical histogram is recorded as H:

$$\max\ g(m, n) - c(m, n) \quad \text{(formula 1)}$$

$$g(m, n) = \frac{\sum_{i=m}^{n} H(i)}{\sum_{i=K_{min}}^{K_{max}} H(i)} \quad \text{(formula 2)}$$

$$c(m, n) = \frac{m-n}{K_{max} - K_{min}}, \quad \text{(formula 3)}$$

wherein m and n are the lower and upper bounds of the required optimal interval, and the interval (m, n) is mapped to the interval (0, 1) for normalization:

$$C = \frac{K-m}{n-m},\qquad\text{(formula 4)}$$

so as to obtain the final shadow-free grayscale image C.

6. An application of the shadow removing method for an image according to claim 1 in the field of machine vision.

7. An application method of the shadow removing method for an image according to claim 1 in road detection, characterized by comprising an image pre-processing process, a road surface extraction process and an image post-processing process; firstly, using a shadow-free feature analysis and extraction process to select a region of interest and extract a feature; next, performing image filtering, segmentation and road surface region selection; lastly, performing image morphology filtering and hole filling; specifically, the application method comprising the following steps:

(81) the image pre-processing process: removing irrelevant regions and interference information;

(82) the road surface extraction process: comprising image segmentation and road surface region selection, wherein the road image is divided into a plurality of regions by image segmentation, each region is evaluated through road surface region selection, and the region which is most likely to be a road surface is selected; and

(83) the image post-processing process: removing excess parts through image morphology filtering, filling holes in the road surface region by adopting a hole filling algorithm, and outputting a road detection result after finishing the post-processing.

8. The application method of the shadow removing method for an image in road detection according to claim 7, characterized in that in step (81), the irrelevant regions are removed specifically by selecting the region of interest, and the interference of shadows is removed through a shadow-free feature extraction method, so as to obtain a shadow-free grayscale image.

9. The application method of the shadow removing method for an image in road detection according to claim 8, characterized in that the shadow-free grayscale image is represented by formula 5:

$$C = 2 - \frac{G-b}{B},\qquad\text{(formula 5)}$$

wherein C is the shadow-free grayscale image, G and B correspond to the component matrices of green color and blue color of the image respectively, b is the camera parameter, and the intercept of the straight line on the G axis is obtained for fitting.

\* \* \* \* \*